April 3, 1956 W. R. GOSS 2,740,904
CIRCUIT FOR VEHICLE REFRIGERATION
Filed May 4, 1954
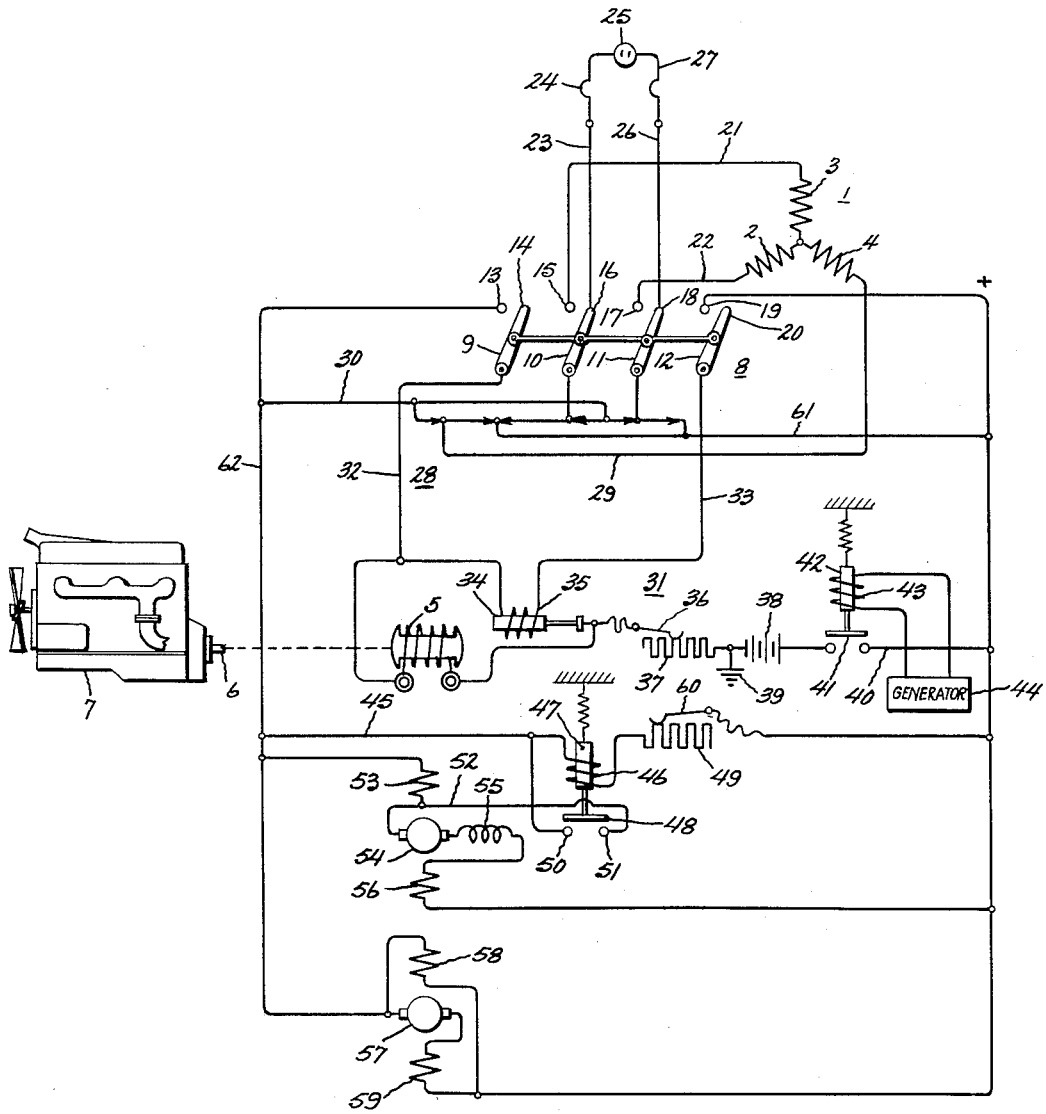
INVENTOR.
Wesley R. Goss,
BY
His Attorney.

United States Patent Office 2,740,904
Patented Apr. 3, 1956

2,740,904

CIRCUIT FOR VEHICLE REFRIGERATION

Wesley R. Goss, Fort Wayne, Ind., assignor to General Electric Company, a corporation of New York Application May 4, 1954, Serial No. 427,454

11 Claims. (Cl. 307—64)

This invention relates to electrical circuits for refrigeration apparatus and more particularly to an improved circuit for providing refrigeration in vehicles.

There are many perishables which require continued refrigeration while they are being transported. In such cases, it is, of course, desirable to provide a reliable refrigeration arrangement which will do a thorough job and yet not take up an undue amount of space. In view of the travel involved, it is further necessary that such a refrigeration system be operable from the prime mover power plant of the vehicle transporting the perishables. While several systems have been devised to achieve these purposes, generally utilizing a self-excited alternator driven by the prime mover for providing the requisite power for the refrigeration apparatus, considerable difficulty has been encountered in achieving an arrangement which is thoroughly dependable. Insofar as the applicant is aware, no arrangement has yet been devised whereby a rapid and dependable buildup of the excitation of the self excited alternator will be attained. In a circuit arranged so that the vehicle battery could aid the excitation buildup, it would of course, be desirable to provide means to disconnect the battery from the field coil of the alternator when the vehicle was not in service, in order to prevent injury to the battery or the generator of the vehicle.

In addition to the above features, there should be made made some provision for times when the vehicle is not to be run but the perishables to be refrigerated are to be left in the vehicle. Thus, it is extremely desirable to have the above described system be readily convertible so that it might be operated by standard 60 cycle alternating current. For the sake of economy, such an adjustment should be possible without necessitating different operating apparatus.

It is, therefore, an object of this invention to provide a circuit for vehicle refrigerating apparatus including the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspects, provides an electrical circuit for refrigerating apparatus wherein generating means are arranged to be driven by the prime mover of a vehicle. The resulting current is rectified and used to run refrigeration apparatus. Part of the output current is used to excite the generating means. The battery of the vehicle preferably is connected into the circuit so that when the generator of the vehicle is producing a predetermined amount of voltage the battery will excite the generating means to build up the excitation at a much more rapid speed than would be possible if the generating means were to depend solely upon being driven by the prime mover without any external source of excitation to start with. A switch is provided so that the entire generating means and battery system may be bypassed, and a source of alternating current rectified and used directly to run the refrigeration apparatus.

In the drawing, the figure is a schematic diagram of the improved circuit of this invention.

Referring now to the drawing, there is shown schematically an alternator 1, of the self excited type, having three armature windings 2, 3 and 4. In addition, alternator 1 has a field winding 5 which is rotatable by the output shaft 6 of a prime mover 7 which drives the vehicle (not shown) in which the refrigeration system is installed. A four pole double throw switch 8 is provided, having four contact arms 9, 10, 11 and 12, engageable respectively with terminals 13 and 14, 15 and 16, 17 and 18, and 19 and 20. Terminal 15 is connected to winding 3 by a line 21 while terminal 17 is connected to winding 2 by a line 22. In one position of switch 8 contact arms 9, 10, 11 and 12 will engage terminals 13, 15, 17 and 19 respectively, and in the other position, they will engage terminals 14, 16, 18 and 20 respectively, terminals 14 and 20 not being utilized in the present arrangement. Terminal 16 is connected by a line 23 including a fuse 24 to a terminal board 25 to which an external source of alternating current (not shown) may be connected. Terminal 18 is likewise connected to this terminal board 25 by line 26 and fuse 27. Windings 2 and 3 are connected through contact arms 11 and 10 respectively to a rectifier 28. Winding 4 is also connected, by means of line 29, to rectifier 28 which is connected by a line 61 to the positive side and by a line 30 to the negative side.

The voltage regulating arrangement indicated generally by the numeral 31 is connected to the negative bus 62 through terminal 13, contact arm 9 and line 32, and is connected to the positive bus 63 through terminal 19, contact arm 12 and line 33. Thus, connection of arm 9 with terminal 13, and of arm 12 with terminal 19, conducts the rectified current from rectifier 28 through the voltage regulating arrangement 31, which includes the field winding 5 of the three phase alternator 1. A relay 34 has a coil 35 which is connected across the rectifier. This relay controls the movement of a contact 36 which moves along a resistance 37 which is in series with the rotatable field winding 5 of the alternator 1. In series with the resistance 37 is the battery 38 of the vehicle with a ground 39 provided at its positive end. Winding 5, resistance 37, and battery 38 are arranged so that they may be connected to the positive bus 63 through a lead 40 and a bridge contact 41 of a relay 42 which is normally biased to the open position. Relay 42 has a coil 43 which is energized through the generator 44 of the vehicle when the generator attains a predetermined voltage output. It will be understood that the electrical system of the vehicle, including the generator 44 and the coil 43 of relay 42, is entirely separate from the remainder of the circuit herein described.

A line 45 extending between the negative and positive busses 62 and 63 includes a coil 46 of a relay 47 which has a bridging contact 48 normally biased to an open position. Line 45 also includes a resistance 49 with a sliding contact 60 which is provided to adjust the resistance so as to control the output voltage at which relay 47 will close bridging contact 48 across contacts 50 and 51. When contact 48 bridges contacts 50 and 51, a short circuit 52 across a series winding 53 of an electric motor 54 is completed. Motor 54 is also provided with a commutator winding 55 in series with another series winding 56. Thus, when the predetermined voltage is attained, motor 54 will run on winding 56 alone, winding 53 being shorted out by line 52. Motor 54 is used to run the refrigeration equipment and will generally, although not necessarily, be on the order of a one horsepower motor. A second motor 57 is also connected across the line; motor 57 will generally be a fractional horsepower motor, since it is used to run the fan for the refrigerating system and power such as that required for motor 54 is not needed. Motor 57 preferably includes a shunt winding 58 and a series winding 59.

The operation of the circuit described above will now be explained. Assuming that the vehicle is at rest with its engine 7 shut off, but with commodities stored therein so that refrigeration is desired, switch 8 is thrown to the position shown for the diagram to connect the apparatus to terminal board 25 which in turn is connected to the external source of alternating current. A circuit is then completed through fuse 27 and line 26 to terminal 18, then through contact arm 11 to rectifier 28, and thence to bus 63 through line 61. With switch 8 in the position shown, contact arms 9 and 12 will have disconnected part 31 of the circuit so that the rectified current from bus 63 is used directly to actuate motors 54 and 57, the use of winding 53 of motor 54 being subject, of course, to the amount of voltage applied to coil 46 of relay 47. The circuit then continues back through negative bus 62, line 30 to contact arm 10, and then through terminal 16, line 23 and fuse 24 back to the terminal board 25. It will, therefore, be seen that an operative refrigeration circuit has been achieved using an external source of alternating current.

Let it now be assumed that the vehicle is to be used to transport the perishables and that refrigeration during the course of travel is desired. Switch 8 is then thrown to its other position so that arms 9, 10, 11 and 12 engage respectively terminals 13, 15, 17 and 19. Engine 7 will rotate shaft 6 which is connected to cause rotation of field winding 5 of alternator 1. At the same time, of course, engine 7 is causing operation of the generator 44 of the vehicle. It must be remembered that alternator 1 is preferably of the self-excited type. Such a generator has the feature that, if left to its own devices, it will build up excitation but at a relatively slow rate. This invention has, therefore, provided relay 42 connected to the vehicle generator. When engine 7 has increased the voltage output of generator 44 to a predetermined amount, bridging contact 41 will close to complete a circuit starting with battery 38 through resistance 37, field coil 5, line 32, contact arm 9, negative bus 62, line 30, rectifier 28, through windings 3 and 4 back through winding 2 to contact arm 11, back through rectifier 28 out through line 61, and around through positive bus 63, line 40 and across closed bridging contact 41. It will therefore be seen that when the generator output has attained a predetermined level, it is possible to utilize output of battery 38 (usually on the order of six volts) to excite winding 5 of alternator 1, so that the excitation of the alternator will rapidly increase to the predetermined level at which resistance 37 and sliding contact 36 will be moved by relay 34 to control the output.

It will be apparent that it is not possible for this method of operation to harm any part of the vehicle since such an exciting circuit cannot be completed until the output of generator 44 is sufficiently high to permit bridging contact 41 to complete the circuit. It will, therefore, be observed that once engine 7 is started, a properly controlled direct current voltage output will very soon be available from rectifier 28. The equipment may be calibated so that this output will be the same as that obtained when the external source of alternating current is used. Therefore, it is now possible to utilize the direct current so obtained to actuate motors 54 and 57 as described above, with current also passing through coil 46 of relay 47 to short out winding 53 at a predetermined voltage level.

It will now be seen that this invention provides a refrigeration circuit in which the vehicle battery is utilized to help build up the excitation of the alternator, thereby to obtain quick and dependable action from the alternator. In addition, the relay coil connected to the vehicle generator insures that the use of the battery for this purpose cannot come about at a time when it would harm the electrical equipment of the vehicle. It will also be observed that this circuit provides for shorting out one winding of the refrigeration motor at a predetermined voltage level. By this means there is attained a series field which gives full field excitation at light currents and low voltages. The series field adds a resistance in the starting circuit which is equivalent to a starting resistance, thereby providing excitation to give high torque. Once the circuit is in operation, this is not necessary and therefore the series winding 53 is shorted out. In addition, it will be observed that this circuit is operable either when the engine of the vehicle is running, or when the vehicle is at rest and the external source of alternating current is used. This has been effected with a single set of motors and rectifiers for both sources of power.

It will, of course, be apparent that modifications in the circuit and in the type of electrical equipment used will be possible. There is no intention, for instance, to restrict this invention to any particular type of electric motor or voltage regulator or rectifier. It will, therefore, be apparent that while the invention has been explained by describing a particular embodiment thereof, improvements and modifications may be made without departing from the scope of the invention as defined in the appended claims.

What I claim as new and desire to secure by Letters Patent of the United States is:

1. An electrical circuit for a refrigerator system for use in an engine driven vehicle having a battery comprising alternating current generating means arranged to be driven by said engine, rectifying means connected to said generating means for converting alternating current to direct current, voltage control means for determining the voltage of said direct current output of said rectifying means, a motor adapted to operate refrigeration apparatus connected to said rectifying means and arranged to be operable by said direct current, a second motor adapted to operate a fan also connected to said rectifying means and arranged to be operable by said direct current, said battery being adapted to be connected to have its output voltage additive to that from said rectifying means, said battery further being adapted to be connected to said generating means so as to excite the same, and switching means adapted to disconnect said generating means and said battery and said voltage control means from said rectifying means, said switching means being further adapted to connect an external source of alternating current to said rectifying means thereby to operate said motors from said external source.

2. An electrical circuit for a refrigeration system for use in an engine-driven vehicle comprising alternating current generating means, said means including a field winding rotatably connected to the engine of said vehicle, rectifying means connected to said generating means for converting alternating current to direct current, voltage control means for regulating the voltage from said rectifying means, motor means adapted to operate refrigeration apparatus connected to said rectifying means and arranged to be operable by said direct current, a battery connected to have its output additive to that from said rectifying means, said battery being serially connected to said field winding thereby to provide excitation therefor, and switching means arranged to disconnect said generating means and said battery and said voltage control means from said rectifying means, said switching means being further arranged to connect an external source of alternating current to said rectifying means thereby to operate said motor means from said external source.

3. An electrical circuit for a refrigeration system for use in an engine-driven vehicle having a generator comprising alternating current generating means, said means including a field winding rotatably connected to the engine of said vehicle, rectifying means connected to said generating means for converting alternating current to direct current, voltage control means for regulating the voltage from said rectifying means comprising a variable resistance serially connected to said field coil, a motor adapted to operate refrigeration apparatus connected to said rectifying means and arranged to be operable by said regulated direct current, a second motor adapted to operate a fan also connected to said rectifying means and arranged to be operable by said regulated direct current, a battery connected to have its output additive to that from said rectifying means, said battery being serially connected to said field winding thereby to provide excitation therefor, contact means serially connected to said battery and means controlled by the vehicle generator to maintain said contacts open until said vehicle generator attains a predetermined voltage output.

4. An electrical circuit for a refrigeration system for use in an engine-driven vehicle having a generator comprising self-excitable alternating current generating means, said means including a field winding rotatably connected to the engine of said vehicle, rectifying means connected to said generating means for converting alternating current to direct current, voltage control means for regulating the voltage from said rectifying means comprising a variable resistance serially connected to said field coil, a battery connected to have its output additive to that from said rectifying means, said battery being serially connected to said field winding thereby to increase the excitation thereof, contact means serially connected to said battery, means controlled by the vehicle generator to maintain said contacts open until said vehicle generator attains a predetermined voltage output, a motor adapted to operate refrigeration apparatus connected to said rectifying means and arranged to be operable by said regulated direct current, said motor having a pair of series field windings, and means for shorting out one of said series field windings after said regulated direct current voltage attains a predetermined value, and a second motor adapted to operate a fan connected to said rectifying means and arranged to be operable by said regulated direct current voltage.

5. An electrical circuit for a refrigeration system for use in an engine-driven vehicle having a generator comprising self-excitable three-phase alternating current generating means, said means including a field winding rotatably connected to the engine of said vehicle, a three-phase bank of rectifiers connected to said generating means for converting alternating current to direct current, voltage control means for regulating the voltage output of said rectifying means comprising a variable resistance serially connected to said field coil, a battery connected to have its output additive to that from said rectifying means, said battery being serially connected to said field winding thereby to increase the excitation thereof, contact means serially connected to said battery, means controlled by the vehicle generator to maintain said contacts open until said vehicle generator attains a predetermined voltage output, a motor adapted to operate refrigeration apparatus connected to said rectifying means and arranged to be operable by said regulated direct current, said motor having a pair of series field windings, means for shorting out one of said series field windings after said regulated direct current voltage attains a predetermined value, and a second motor connected in parallel with said first motor and adapted to operate a fan, said second motor having a series field winding and a shunt field winding.

6. An electrical circuit for a refrigeration system for use in an engine-driven vehicle having a generator comprising self-excitable three-phase alternating current generating means, said means including a field winding rotatably connected to the engine of said vehicle, a three-phase bank of rectifiers connected to said generating means for converting alternating current to direct current, voltage control means for regulating the voltage from said rectifying means comprising a variable resistance serially connected to said field coil, a battery connected to have its output additive to that from said rectifying means, said battery being serially connected to said field winding thereby to increase the excitation thereof, said battery being grounded on its positive side, contact means serially connected to said battery, relay means controlled by the vehicle generator to maintain said contacts open until said vehicle generator attains a predetermined voltage output, a motor adapted to operate refrigeration apparatus connected to said rectifying means and arranged to be operable by said regulated direct current, said motor having a pair of series field windings, a relay coil subject to said regulated direct current, contact bridging means controlled by said relay coil and arranged to short out one of said series field windings after said regulated direct current voltage attains a predetermined value, and a second motor adapted to operate a fan connected to said rectifying means and arranged to be operable by said regulated direct current voltage.

7. An electrical circuit for a refrigeration system for use in an engine-driven vehicle comprising alternating current generating means, said means including a field winding rotatably connected to the engine of said vehicle, rectifying means connected to said generating means for converting alternating current to direct current, voltage control means for regulating the voltage output of said rectifying means, motor means adapted to operate refrigeration apparatus connected to said rectifying means and arranged to be operable by said direct current, switching means arranged to disconnect said generating means from said rectifying means, said switching means being further adapted to connect an external source of alternating current to said rectifying means thereby to operate said motor means from said external source.

8. An electrical circuit for a refrigeration system for use in an engine-driven vehicle having a generator comprising alternating current generating means, said means including a field winding rotatably connected to the engine of said vehicle, rectifying means connected to said generating means for converting alternating current to direct current, voltage control means for regulating the voltage from said rectifying means, a battery connected to have its output voltage additive to that from said rectifying means, said battery being connected to said generating means so as to excite the same, contact means serially connected to said battery, and means controlled by the vehicle generator to maintain said contacts open until said vehicle generator attains a predetermined voltage output, a motor adapted to operate refrigeration apparatus connected to said rectifying means and arranged to be operable by said direct current, a second motor adapted to operate a fan also connected to said rectifying means and arranged to be operable by said direct current, switching means arranged to disconnect said generating means and said battery from said rectifying means, said switching means being further arranged to connect an external source of alternating current to said rectifying means thereby to operate said motors from said external source.

9. An electrical circuit for a refrigeration system for use in an engine-driven vehicle having a generator comprising self-excitable alternating current generating means, said means including a field winding rotatably connected to the engine of said vehicle, rectifying means connected to said generating means for converting alternating current to direct current, voltage control means for regulating the voltage from said rectifying means comprising a variable resistance serially connected to said field coil, a battery connected to have its output additive to that from said rectifying means, said battery being serially connected to said field winding thereby to increase the excitation thereof, contact means serially connected to said battery, means controlled by the vehicle generator to maintain said contacts open until said vehicle generator attains a predetermined voltage output, a motor adapted to operate refrigeration apparatus connected to said rectifying means and arranged to be operable by said regulated direct current, said motor having a pair of series field windings, means for shorting out one of said series field windings after said regulated direct current voltage attains a predetermined value, and a second motor adapted to operate a fan connected to said rectifying means and arranged to be operable by said regulated direct current voltage, switching means arranged to disconnect said generating means and said voltage control means and said battery from said rectifying means, said switching means being further arranged to connect an external source of alternating current to said rectifying means thereby to operate said motors from said external source.

10. An electrical circuit for a refrigeration system for use in an engine-driven vehicle having a generator comprising self-excitable three-phase alternating current generating means, said means including a field winding rotatably connected to the engine of said vehicle, a three-phase bank of rectifiers connected to said generating means for converting alternating current to direct current, voltage control means for regulating the voltage from said rectifying means comprising a variable resistance serially connected to said field coil, a battery connected to have its output additive to that from said rectifying means, said battery being serially connected to said field winding thereby to increase the excitation thereof, contact means serially connected to said battery, means controlled by the vehicle generator to maintain said contacts open until said vehicle generator attains a predetermined voltage output, a motor adapted to operate refrigeration apparatus connected to said rectifying means and arranged to be operable by said regulated direct current, said motor having a pair of series field windings, means for shorting out one of said series field windings after said regulated direct current voltage attains a predetermined value, a second motor connected in parallel with said first motor and adapted to operate a fan, said second motor having a series field winding and a shunt field winding, four-pole double-throw switching means arranged to disconnect said generating means and said voltage control means and said battery from said rectifying means, said switching means being further arranged to connect an external source of alternating current to said rectifying means thereby to operate said motors from said external source.

11. An electrical circuit for a refrigeration system for use in an engine-driven vehicle having a generator comprising self-excitable three-phase alternating current generating means, said means including a field winding rotatably connected to the engine of said vehicle, a three phase bank of rectifiers connected to said generating means for converting alternating current to direct current, voltage control means for regulating the voltage from said rectifying means comprising a variable resistance serially connected to said field coil, a battery connected to have its output additive to that from said rectifying means, said battery being serially connected to said field winding thereby to increase the excitation thereof, said battery being grounded on its positive side, contact means serially connected to said battery, relay means controlled by the vehicle generator to maintain said contacts open until said vehicle generator attains a predetermined voltage output, a motor adapted to operate refrigeration apparatus connected to said rectifying means and arranged to be operable by said regulated direct current, said motor having a pair of series field windings, a relay coil subject to said regulated direct current, contact bridging means controlled by said relay coil and arranged to short out one of said series field windings after said regulated direct current voltage attains a predetermined value, a second motor adapted to operate a fan connected to said rectifying means and arranged to be operable by said regulated direct current voltage, a four-pole double throw switching means arranged to disconnect said generating means and said voltage control means and said battery from said rectifying means, said switching means being further arranged to connect an external source of alternating current to said rectifying means thereby to operate said motors from said external source.

References Cited in the file of this patent

UNITED STATES PATENTS

| | | |
|---|---|---|
| 2,095,106 | Stohr | Oct. 5, 1937 |
| 2,357,086 | Crever | Aug. 29, 1944 |
| 2,608,066 | Kirkpatrick | Aug. 26, 1952 |
| 2,637,175 | Alexander | May 25, 1953 |